US008676686B2

(12) United States Patent
Landry (10) Patent No.: US 8,676,686 B2
(45) Date of Patent: *Mar. 18, 2014

(54) PROGRAM FOR ALTERNATIVE FUNDING OF EMPLOYEE AND RETIREE BENEFITS

(75) Inventor: Karin Landry, Cambridge, MA (US)

(73) Assignee: Spring Consulting Group, LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/593,176

(22) Filed: Aug. 23, 2012

(65) Prior Publication Data

US 2012/0323610 A1    Dec. 20, 2012

Related U.S. Application Data

(63) Continuation of application No. 12/453,045, filed on Apr. 28, 2009, now Pat. No. 8,275,684, which is a continuation-in-part of application No. 11/157,161, filed on Jun. 21, 2005, now Pat. No. 7,761,352, which is a continuation-in-part of application No. 10/995,325, filed on Nov. 24, 2004, now Pat. No. 8,060,384.

(51) Int. Cl.
*G06Q 40/00* (2012.01)

(52) U.S. Cl.
USPC .............. 705/35; 705/36 R; 705/4; 705/36 T; 705/39; 705/1.1

(58) Field of Classification Search
USPC ............. 705/1.1, 35, 36 R, 4, 36 T, 2, 39, 37; 463/25, 29; 235/380
See application file for complete search history.

(56) References Cited

U.S. PATENT DOCUMENTS

| | | | |
|---|---|---|---|
| 5,136,502 A * | 8/1992 | Van Remortel et al. .......... 705/2 |
| 5,806,042 A | 9/1998 | Kelly et al. |
| 2001/0049612 A1 | 12/2001 | Davis |
| 2003/0135395 A1 | 7/2003 | Carli et al. |
| 2006/0111946 A1 | 5/2006 | Landry |
| 2006/0111996 A1 | 5/2006 | Landry |
| 2006/0173720 A1 | 8/2006 | Berens et al. |
| 2008/0228660 A1 | 9/2008 | Dearden |
| 2008/0288295 A1 * | 11/2008 | Caballero et al. ................. 705/4 |
| 2010/0256997 A1 | 10/2010 | Landry |

OTHER PUBLICATIONS

"Retiree Rule May Spur Captive Use", by: Karin J. Landry and Henry DeVos Lawrie Jr.; National Underwriter Property & Casualty / Risk & Benefits Management Edition; May 24, 1993.*
Landry, Karen et al., "Rethinking Retiree Medical: Medicare Reform and the Implications for Employers", Sep. 15, 1998.

(Continued)

*Primary Examiner* — John H Holly
(74) *Attorney, Agent, or Firm* — Jones Days (57) ABSTRACT

An investment program for funding benefits by maintaining assets in the investment program that includes an employer owned trust account and at least one life, disability, health or annuity contract (including a terminal annuity) obtained directly or indirectly from a partially or wholly owned or non-owned captive insurance company. The insurance contract is purchased with assets from the trust account and the partially or wholly owned or non-owned captive insurance company is a least partially, wholly or non-owned by the employer. When paying or reimbursing benefits, the employer or the trust may pay the benefit and if the employer pays the benefit, the trust may reimburse the employer.

9 Claims, 6 Drawing Sheets

(56) References Cited

OTHER PUBLICATIONS

Landry, Karen, "Post-Retirement Benefits Funding", Oct. 4, 2010.
Landry, Karen, "Reconsidering Retiree Medical Funding" Apr. 1998.
Geisel, Jerry, "Coke Uncaps Captive Plan; New Tack for Retiree Care" Dec. 1, 2008.
Tompkins, Wayne, "New Accounting Rule Give Cities Credit Concerns", Public Finance, Jun. 26, 2008.
Stanton, Timothy, "Retiree Health Financing Idea Links VEBA, Bermuda Insurer" Business Insurance, Nov. 13, 1995.
Fundling, Jay et al., "Retiree Medical Funding—You May Be Stuck With It" Benefits Across Borders, Dec. 2009.
Landry, Karin et al., "Retiree Rule May Spur Captive Use", National Underwriter, May 24, 1993.
Kelly, Susan, "You Can Retire, But Don't Get Sick", Treasury & Risk, Sep. 2004.
Geisel, Jerry, "Whirlpool Scraps funding Plan for Retiree Care", Business Insurance, Dec. 13, 2004.
Wright, P. Bruce et al., "DOL Issues Proposed Exemption on Funding Benefits Through Captive", Mar. 2003.
International Search Report dated Jun. 29, 2010 for PCT/US2010/0032667.
Geisel, Jerry, "Whirlpool Crafts Innovative Plan to Fund Benefits", Business Insurance, Aug. 16, 2004.
Geisel, Jerry, "DOL Ruling Opens door to Benefits to Captives", Business Insurance, Aug. 21, 2000.
"Whirlpool Funding Plan Worth a Look", Business Insurance, Aug. 23, 2004.
Geisel, Jerry, "DOL Denies Fast-Track for Whirlpool Benefits Captive", Business insurance, Sep. 20, 2004,.
Strazewski, Len, "Captive Growth", Human Resource Executive, May 16, 2003.
Wright, Bruce et al., "DOL Issues Proposed Exemption on Funding Benefits Through Captive", www.captive.com.
Goff, Dick, "Branch Captives in D.C.", Captive Insurance Council of the District of Columbia, Inc., 2005.
Girer, Chris, "International Paper Seeks to Reinsure Benefits with Captive", A.M. Best Company, Inc., 2003.
"DOL Approves Use of Captive for Employee Benefits", Alternative Views, ACSG Newsletter, Issue 25, Nov. 2003.

\* cited by examiner

PROGRAM FOR ALTERNATIVE FUNDING OF EMPLOYEE AND RETIREE BENEFITS

CROSS-REFERENCE TO RELATED APPLICATION

This Application is a Continuation-in-Part of U.S. application Ser. No. 11/157,161, filed on Jun. 21, 2005 which is a Continuation-in-Part of U.S. application Ser. No. 10/995,325, filed on Nov. 24, 2004. Each of these applications is herein incorporated by reference, in its entirety.

BACKGROUND

1. Field of the Disclosure

The present disclosure relates generally to facilitating and/or providing benefits to employees and retirees. More specifically, the present disclosure relates to an electronic computer implemented system and method for configuring, optimizing, selecting, managing and tracking alternative funding of employee and retiree benefits and benefit plans.

2. Description of Related Art

Conventionally, employers have provided retirement benefits including pensions, defined contribution retirement and other retirement programs funded by trusts which invest in marketable securities. Retirement trusts have also invested in instruments issued by third party insurance companies in which they have no stake, or other investments. These investments do not always pay returns or increase in value when the trust needs the money due to upcoming payments or an increase in the measurement of the retirement programs' liability.

Additionally, when an employer wishes to terminate a pension plan, they have conventionally purchased terminal annuities from an external insurance company. This insurance company takes on the obligations of the plan, for a payment. The insurance companies have traditionally charged a very high price for this service. Additionally, if the experience of the plan in subsequent years is better than the conservative pricing implies, the insurance company keeps the profit.

Additionally, commonly accepted accounting principles have forced employers to reflect the funded status of retirement programs and pensions on their corporate financial statements.

Additionally, changes in retirement programs' and pensions' regulation have led to accelerated funding schedules based on the funded status of retirement programs.

This trend has put a substantial strain on employers, on employees and their families, and on retirees and their families. Employers' long term liabilities appear to be more costly due to short term market movements and the employees and retirees become concerned about adequacy of benefits if the assets and liabilities of the plan do not match. Accordingly, a system is needed to assist employers in investing the retirement programs' assets in vehicles that will respond to market movements in the same way as the plan liabilities, without undue cost to the employer.

Additionally, the system should assist with the orderly and secure termination of pension plans in a way that is affordable to employers and provides benefit security to employees and retirees.

SUMMARY

Certain exemplary embodiments provide a method for funding retirement benefits including pensions, defined contribution and other retirement programs benefits through at least one life, disability, health or annuity contract or some combination thereof obtained directly or indirectly from a partially or wholly owned or non-owned captive insurance company. The life, disability, health or annuity contract is purchased with assets from the trust account and the partially or wholly owned or non-owned captive insurance company is at least partially owned or non-owned by the employer. The life, disability, health or annuity contract is payable for the life of a current or future retiree or their dependent or for a fixed period.

Certain exemplary embodiments provide a method for terminating a pension plan through the purchase of terminal annuities obtained directly or indirectly from a partially or wholly owned or non-owned captive insurance company. The terminal annuities are purchased with assets from the trust account. The partially or wholly owned or non-owned captive insurance company is at least partially owned or non-owned by the employer. The terminal annuities take on some or all of the obligations of the pension plan to the participants in the plan including employees, former employees, retirees and their beneficiaries.

Certain exemplary embodiments allow the trust or the partially or wholly owned or non-owned captive insurance company to invest its assets in commercially available vehicles to generate additional assets, and in certain embodiments the investment may be in the employer's own securities including short term commercial paper and/or accounts receivable.

Certain exemplary embodiments provide a method of funding benefits where the partially or wholly owned or non-owned captive insurance company is wholly or partially owned or non-owned by the employer, is a rent-a-captive, a protective cell captive, a group captive, risk retention group or any other form of a partially or wholly owned or non-owned captive insurance company as defined and authorized by the respective domicile of the partially or wholly owned or non-owned captive insurance company.

Certain exemplary embodiments provide benefits including, for example, health care benefits, retirement benefits, executive compensation, and/or life insurance. These benefits may be provided to employees and/or retirees.

BRIEF DESCRIPTION OF THE DRAWINGS

Additional features and advantages of the exemplary embodiments described herein will become apparent from the following detailed description of embodiments in conjunction with the accompanying drawings where like reference numerals indicate like features, in which.

DETAILED DESCRIPTION OF EMBODIMENTS

Figure 1A:
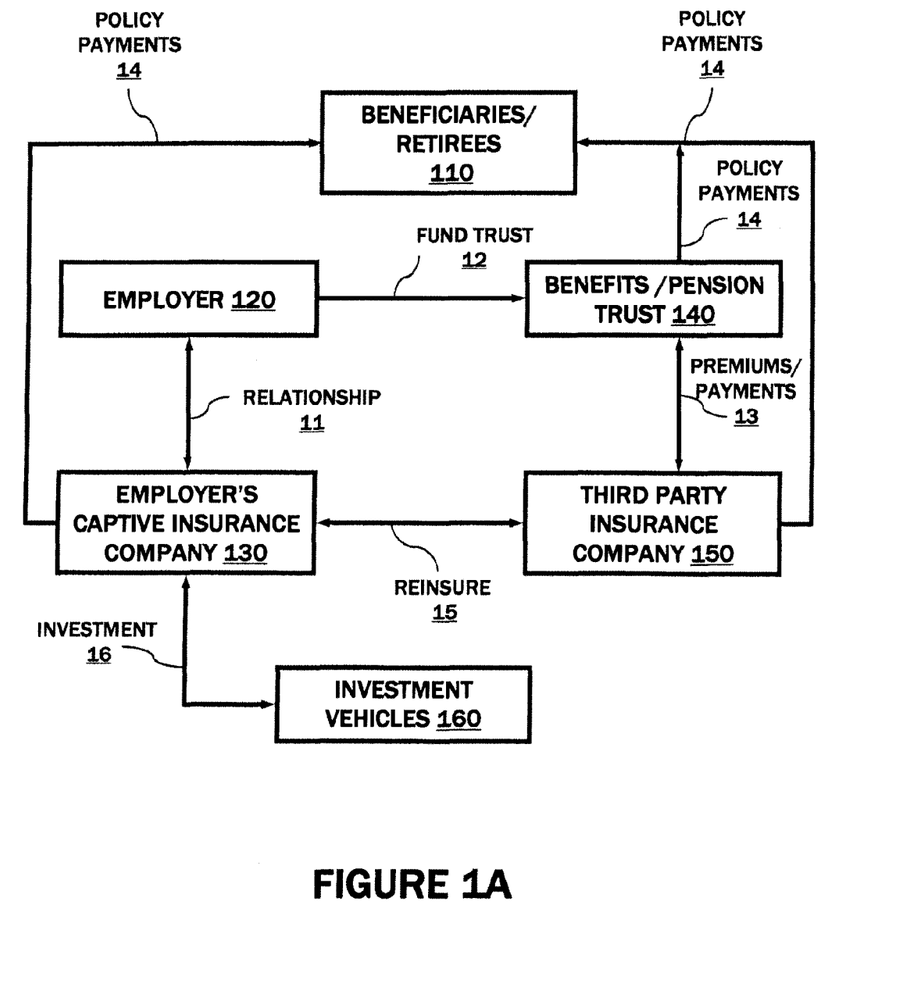
FIG. 1A is a schematic drawing of a funding program for employee and retiree benefits or terminating a pension plan in accordance with exemplary embodiments described herein.

FIG. 1 is a schematic drawing of an alternative funding program for employee and retiree benefits in accordance with exemplary embodiments described herein. As illustrated in FIG. 1, the funding program includes an employer 120 (or governmental entity or municipality, Taft-Hartley, association, non-profit entity like a church, in some embodiments), a benefits/pension trust 140, a partially or wholly owned or non-owned captive insurance company 130, and a third party insurance company 150.

The benefits/pension trust 140 purchases life, disability, health or annuities (including terminal annuities) from a third party insurance company or directly through the captive insurance. The third party insurance company 130 reinsures the life, disability, health or annuities with the employer's partially or wholly owned or non-owned captive insurance company.

As illustrated in the embodiment of FIG. 1A, the employer 120 and the partially or wholly owned or non-owned captive insurance company 130 have a relationship 11 (e.g., a subsidiary relationship, a brother-sister relationship, etc.). Specifically, in some embodiments, the partially or wholly owned or non-owned captive insurance company 130 may be a wholly owned subsidiary of the employer. Alternatively, in other embodiments, the partially or wholly owned or non-owned captive insurance company 130 may be a wholly or partially owned subsidiary of the employer 120 or a non-owned captive vehicle. In fact, there are several arrangements between the partially or wholly owned or non-owned captive insurance company 130 and the employer 120 that would provide similar benefits as a subsidiary relationship 11. As would be readily understood by a person of ordinary skill in the art, a group partially or wholly owned or non-owned captive insurance company (i e., a captive insurance company that is shared between a group of employers 120) may provide similar tax advantages while reducing the cost attributed to each employer. These types of captive insurance companies may be referred to as sponsored captive insurance companies, rent-a-captive, segregated account companies, protected cell companies, group captives, risk retention groups or association captives or other entities allowed by the laws in the respective domicile. Alternatively, other forms of captive insurance companies 130 may include, for example, agency captives, branch captives and rental captives.

In general, however, the partially or wholly owned or non-owned captive insurance company 130 is defined by the domicile of the partially or wholly owned or non-owned captive insurance company. For example, in embodiments, the partially or wholly owned or non-owned captive insurance company may be domiciled in Vermont (generally a "captive friendly" state). According to Title 8, Section 6001 of the Vermont Statute, the definition of a partially or wholly owned or non-owned captive insurance company is "any pure captive insurance company, association captive insurance company, sponsored captive insurance company, industrial insured captive insurance company, or risk retention group formed or licensed under the provisions of this chapter. For purposes of this chapter, a branch captive insurance company shall be a pure captive insurance company with respect to operations in this state, unless otherwise permitted by the commissioner". The section further defines, for example, a pure captive insurance company as any company that insures risks of its parent, affiliated companies or controlled unaffiliated business. These definitions are exemplary of statutes that may exist in other states as well. Of course, as would be generally understood by a person of ordinary skill in the art, many variations of the definition may exist based on, for example, the domicile of the partially or wholly owned or non-owned captive insurance company 130. In other embodiments, the term "captive" may be used generally to describe an insurance company that insures the risk of its owners who are not in the business of insurance.

As would be understood by a person of ordinary skill in the art, each of these captive insurance company examples have their respective benefits and should be selected to meet an employer's needs. Additionally, the embodiments described herein should not be limited to the specific types of captives discussed above, any type or form of partially or wholly owned or non-owned captive insurance company would fall within the scope of the present disclosure.

As previously mentioned, the trust may purchase life, disability, health or annuities (including terminal annuities) with its funds. As illustrated in FIG. 1A, the trust pays premiums to a third party insurance company or the captive directly. The third party insurance company issues a life, disability, health or annuity contract. This life, disability, health or annuity contract may be payable for the life of a current or future retiree or dependent, or for a fixed period, or a single payment, or some combination thereof. Examples of such life, disability, health or annuity contracts may include but are not limited to:

1) a life, disability, health or annuity contract which substantially matches the amount and payment period of a benefit currently paid from the retirement trust to a retiree or dependent;
2) a life, disability, health or annuity contract which approximates the amount and payment period of a benefit currently paid by the retirement trust to a retiree or dependent;
3) a life, disability, health or annuity contract which will substantially match the amount and payment period of a future benefit to be paid to a former employee, which may be affected by this former employee's choice of payment, timing and form;
4) a life, disability, health or annuity contract which approximates the future amount and payment period of a former employee, but will not be modified by any choice made by this former employee;
5) a life, disability, health or annuity contract or any combination thereof which will substantially match the amount and payment period of a future benefit to be paid to a current or former employee, which may be affected by this current or former employee's choice of payment, timing and form. This may be limited to the benefit the employee has currently earned or may include additional payments reflecting the additional benefit the employee is expected to earn through continued employment;
6) a life, disability, health or annuity contract which approximates the future amount and payment period of a current or former employee, but will not be modified by any choice made by this current or former employee. This may be limited to the benefit the employee has currently earned, or may include additional payments reflecting the additional benefits the employee is expected to earn through continued employment;

7) a life, disability, health or annuity contract payable for a fixed period of time, unrelated to any mortality;

8) a life, disability, health or annuity contract whose payments may vary based on the longevity, morbidity, and/or mortality experience of current and future retirees or of the larger population;

9) any life, disability, health or annuity contract as described above which pays some percentage of the benefit described above;

10) any life, disability, health or annuity contract as described above which may be cashed out or converted to a different life, disability, health or annuity contract based on the survival of a different individual or payable for a fixed time;

In accordance with exemplary embodiments, the trust may acquire any combination of annuities on any group of persons. Of course, as would be understood by any person of ordinary skill in the art, there are practical limits for acquiring annuities based on the life of a person. For example, the retirement program is aware of the survivorship status of its current participants, and can communicate this information to the captive to ease administration. However, if a participant takes a lump sum benefit from the retirement program and ends their relationship with that retirement program, it would be difficult for the captive to administer the life, disability, health or annuity contract unless the life, disability, health or annuity contract was converted to a lump sum payment to the trust or to an life, disability, health or annuity contract for a fixed period.

Additionally, it would be difficult, but not out of the scope of the present disclosure, to select arbitrary persons to name on annuities.

Additionally, as would be readily understood by a person of ordinary skill in the art, it may be desirable or required by law to hold assets in the retirement trust outside of life, disability, health or annuity contract investments.

In situations where the third party insurance company issues an ongoing or terminal-annuity contract (e.g., for the termination of a pension), the contract may-take on all the obligations of the plan to the participants, including all available payment options and payment periods promised by the plan. Examples of such annuity contracts may include, but are not limited to 1) an annuity contract which pays a fixed benefit for the life of the participant;

2) an annuity contract which pays a Joint and Survivor or Contingent Annuitant benefit payable for the life of the retiree and a dependent, with a possible reduction in payment upon the death of the retiree or the dependent;

3) a Certain and Life annuity contract which will pay a fixed amount for the length of the life of the participant, in no case less than a fixed amount of time, for example five or ten years;

4) an annuity contract which provides a greater payment before the participant reaches an eligibility age for Social Security or some other program, in order to level or approximately level total payment over the lifetime of the participant when the two programs are considered together;

5) a lump sum payment of full benefits on the option of the participant under certain conditions;

6) an annuity contract which pays any other stream of payments offered by the pension plan; or 7) any combination of the above.

Figure 2A:
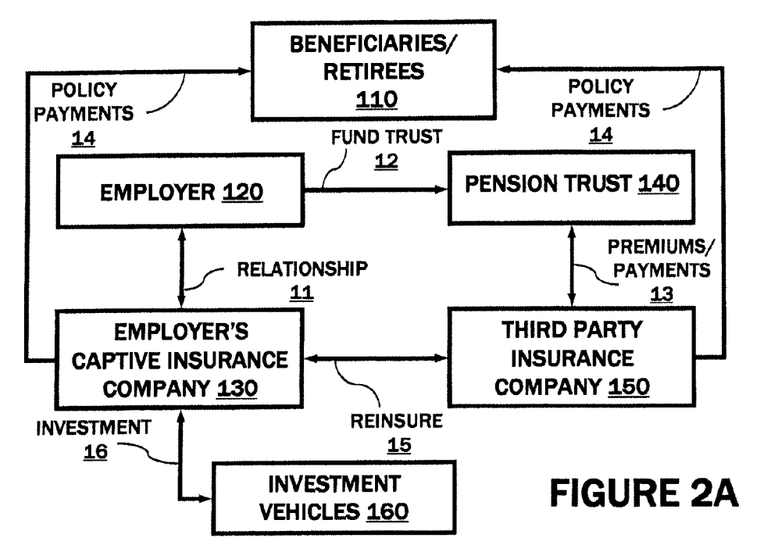
FIG. 2A is a schematic drawing of a funding program for terminating a pension plan in accordance with exemplary embodiments described herein.
Figure 2B:
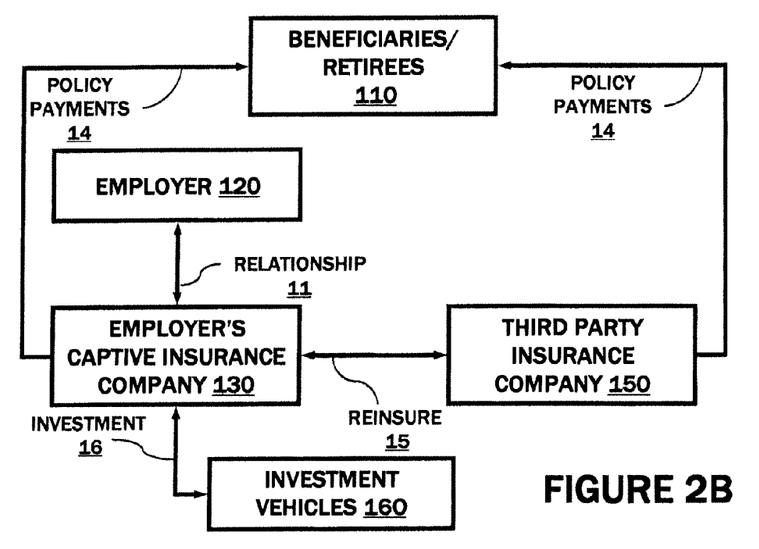
FIG. 2B is a schematic drawing of a funding program for terminating a pension plan in accordance with exemplary embodiments described herein.

Additionally, with reference to FIG. 2A and FIG. 2B, when the employer is interested in terminating a pension plan, the trust may or may not be necessary after the initial funding event. Accordingly, the pension trust 140 purchases annuities from a third party insurance company or directly through the captive insurance. The third party insurance company 130 reinsures the life, disability, health or annuities with the employer's partially or wholly owned or non-owned captive insurance company. In the case of terminating a pension, the annuities are generally purchased by the trust as a single up front payment to the third party insurance company 150 or the captive insurance 130 and the proceeds of the annuity are generally paid 14 directly to the beneficiaries/retirees 110. Accordingly, as seen in FIG. 2B, after the pension trust 140 is funded 12 the pension trust 140 may cease to exist. Although the pension trust 140 ceases to exist, the obligation of the captive insurance company 130 and/or the third party insurance company 150 to pay 14 the beneficiaries when appropriate remains.

The insurance policies that are issued by the captive directly or by a third party insurance company 150 are then reinsured 15 by the employer's partially or wholly owned or non-owned captive insurance company 130. By reinsuring 15 the insurance policies, the employer's partially or wholly owned or non-owned captive insurance company 130 assumes the risk of the policies (i.e., the employer's partially or wholly owned or non-owned captive insurance company assumes liability for the payment of at least a portion of the policy payments 14 from the third party insurance company 150 in exchange for a premium paid to the employer's partially or wholly owned or non-owned captive insurance company 130. Accordingly, the third party insurance company is sometimes called a fronting company since the third party insurance company may only be involved in administering the policy. Additionally, in some embodiments, the third party insurance company may also be secondarily liable for the beneficiary proceeds.

In exemplary embodiments, the employer's partially or wholly owned or non-owned captive insurance company 130 assumes none of, part of or the entire risk from the third party insurance company 150. If the entire risk is assumed, then the third party insurance company is a fronting company. The premiums 13 paid by the trust 140 may be forwarded to the employer's partially or wholly owned or non-owned captive insurance company 130, often less a fee retained by the third party insurance company 150 for their initial and ongoing services.

In exemplary embodiments, the employer's partially or wholly owned or non-owned captive insurance company 130 may assume the risk directly. The employer's partially or wholly owned or non-owned captive insurance company may or may not then purchase insurance which would cover the obligations to protect against the inability of the employer's partially or wholly owned or non-owned captive insurance company to pay the required benefits.

Figure 1B:
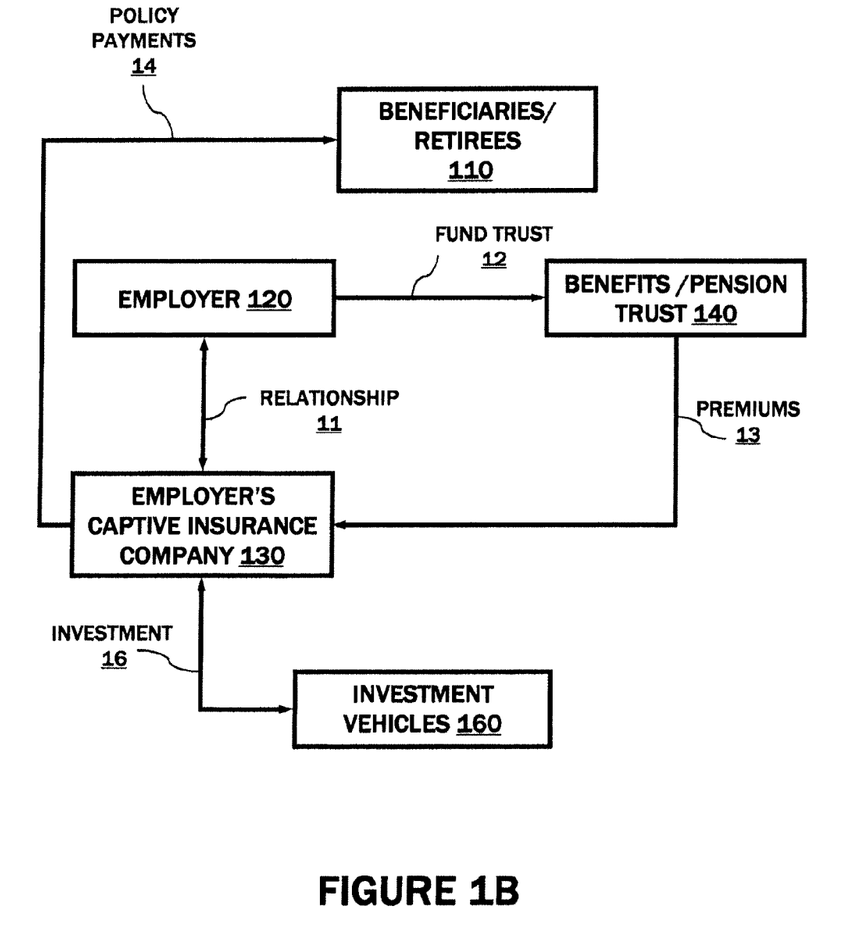
FIG. 1B is a schematic drawing of a funding program for employee and retiree benefits or terminating a pension plan in accordance with exemplary embodiments described herein.

In some embodiments, the third party insurance company 150 may not be necessary and the employer's partially or wholly owned or non-owned captive insurance company 130 may simply assume both roles. Specifically, as illustrated in FIG. 1B, which is a schematic drawing of another embodiment of a funding program in accordance with exemplary embodiments described herein, the reinsurance may not be necessary if the partially or wholly owned or non-owned captive insurance company 130 is able to assume both roles. However, the third party insurance company is beneficial to the employer, especially if the employer has employees, retirees and/or beneficiaries 110 in several states. For example, the employer's partially or wholly owned or non-owned captive insurance company may not be as large as a traditional commercial insurance provider. The limited size of the partially or wholly owned or non-owned captive insurance company, may prevent it from being able to write life insurance contracts in all of the necessary states. Accordingly, a well established third party insurance company 150 may provide this function, generally for a small administrative fee. In general, the various functions of an insurance company, including administrative functions, paying benefits, and collecting premiums, may be distributed between the third party insurance company and the partially or wholly owned or non-owned captive insurance company in any manner that is acceptable for satisfying the employer's needs.

Figure 3:
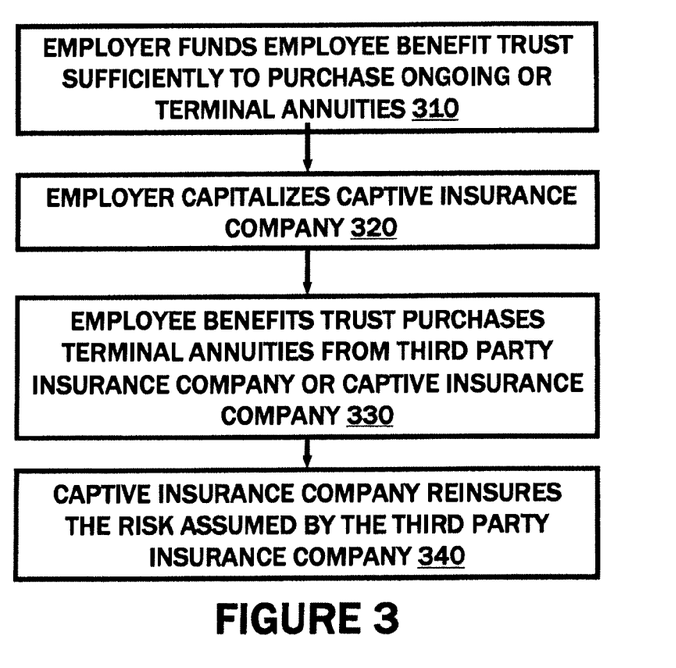
FIG. 3 is a flow chart illustrating how the initial life, disability, health or annuity contract purchase is conducted in accordance with exemplary embodiments described herein.
Figure 4:
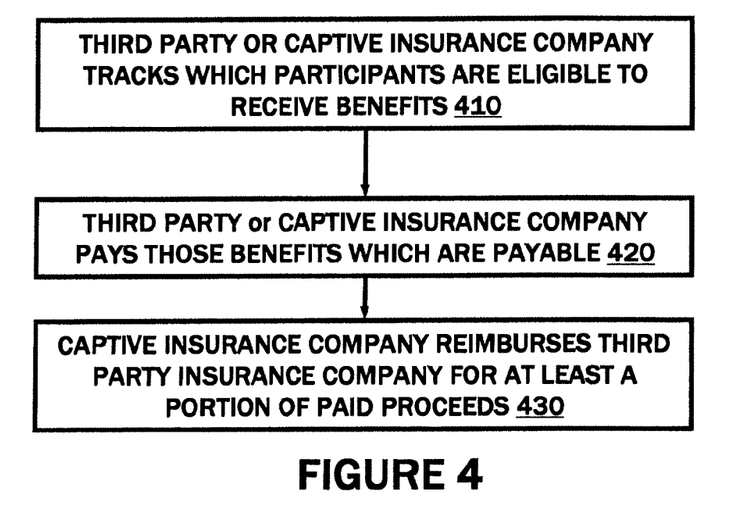
FIG. 4 is a flow chart illustrating how benefits may be paid back to the retirement trust in accordance with exemplary embodiments described herein.

FIG. 3 and FIG. 4 are flow charts illustrating how the initial life, disability, health or annuity contract purchase is conducted and paid back to the retirement trust, respectively, in accordance with exemplary embodiments described herein. Initially, the employer funds 310 the trust sufficiently to purchase for example, terminal annuities. Next the employer capitalizes 320 the captive insurance company. The trust then purchases 330 terminal annuities, for example, from the third party insurance company or the captive insurance company. The captive insurance company then reinsures 340 the risk assumed by the third party insurance company. As previously mentioned, if the employer's partially or wholly owned or non-owned captive insurance company 130, assumes any portion of the risk, it may be responsible for paying the payments 14 discussed above. Accordingly, FIG. 4 is one embodiment of how the payments 14 may reach the retirement trust 140. When the third party insurance company 150 is notified that payments need to be made, at step 510, the third party insurance company 150 subsequently pays the proceeds 14 to the retirement trust 140 at step 520. The partially or wholly owned or non-owned captive insurance company 130 is notified and reimburses the third party insurance company 150 for at least a portion of the paid beneficiary proceeds 14, at 530. The captive may, for example, only require notification when a life, disability, health or annuity payment begins, ends or changes.

Figure 5:
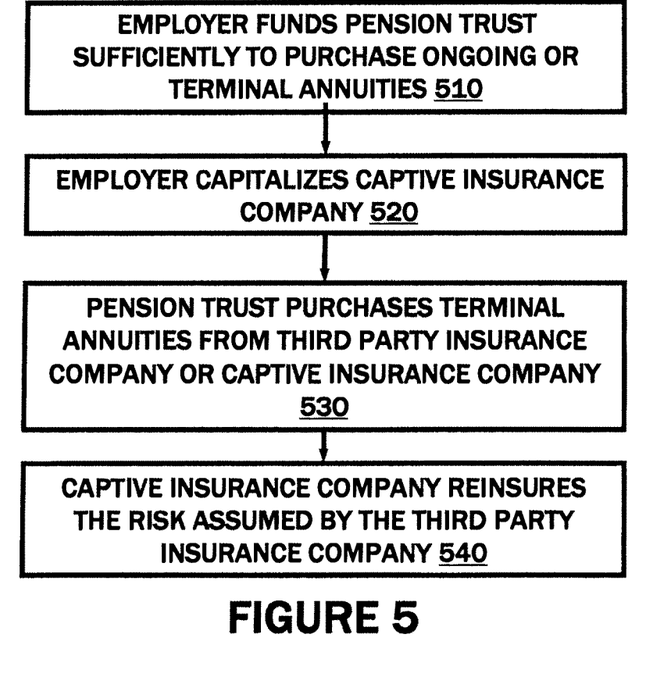
FIG. 5 is a flow chart illustrating how the initial contract purchase is conducted-in accordance with exemplary embodiments described herein.
Figure 6:
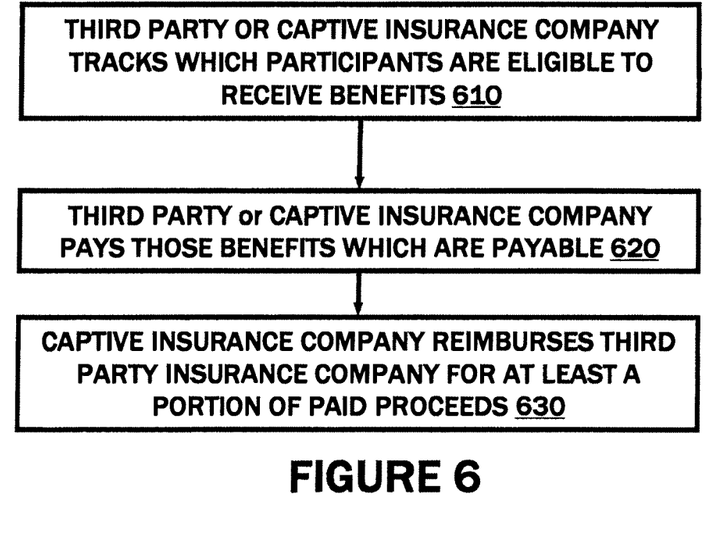
FIG. 6 is a flow chart illustrating how ongoing payments will be made to the beneficiaries in accordance with exemplary embodiments described herein.

FIG. 5 and FIG. 6 are flow charts illustrating how the initial contract purchase is conducted and how ongoing payments will be made to the beneficiaries, respectively, in accordance with exemplary embodiments described herein. Initially, the employer funds 510 the pension trust sufficiently to purchase for example, terminal annuities. Next the employer capitalizes 520 the captive insurance company. The trust then purchases 530 terminal annuities, for example, from the third party insurance company or the captive insurance company. The captive insurance company then reinsures 540 the risk assumed by the third party insurance company. If the employer's partially or wholly owned or non-owned captive insurance company 130 assumes any portion of the risk, it may be responsible for paying the beneficiary proceeds 14 discussed above. Accordingly, FIG. 6 is one embodiment of how the beneficiary proceeds 14 may reach the retiree or beneficiary 110. The third party insurance company 150 tracks eligibility of benefits at step 610 and pays the beneficiary proceeds 14 to the retiree or beneficiary 110 at step 620. The partially or wholly owned or non-owned captive insurance company 130 is notified and reimburses the third party insurance company 150 for at least a portion of the paid beneficiary proceeds 14, at 630. The captive may only require notification when an annuity payment begins, ends or changes.

As would be readily understood by a person skilled in the art, other variations of this process may also be utilized. For example, in embodiments, the employer's partially or wholly owned or non-owned captive insurance company 130 may pay the beneficiary proceeds 14 directly to the retirement trust 140. This may provide additional benefits to the employer depending on the specific situation.

As discussed above, premiums may be paid by the third party insurance company 150 to the employer's partially or wholly owned or non-owned captive insurance company 130 in exchange for the employer's partially or wholly owned or non-owned captive insurance company 130 assuming some of or all of the risk. Depending on various laws that may exist related to how the employer's partially or wholly owned or non-owned captive insurance company utilizes the funds that it receives, the employer's partially or wholly owned or non-owned captive insurance company 130 invests 16 its funding into investment vehicles to generate additional funds.

The employer's partially or wholly owned or non-owned captive insurance company 130 invests its funds in investment vehicles 160.

Several investment vehicles may be utilized by either the employer's partially or wholly owned or non-owned captive insurance company 130 or the retirement trust 140. One such investment vehicle is an investment in the employer's own securities including the employer's short term commercial paper and/or accounts receivable. The short term commercial paper provides the necessary return that a partially or wholly owned or non-owned captive insurance company or trust may seek while maintaining the liquidity of the assets. Liquidity, as should be readily understood by a person of ordinary skill in the art, may be important since both the partially or wholly owned or non-owned captive insurance company and the retirement trust may need to make fairly large payments without much notice.

As would be understood by a person skilled in the art, other conventional investment vehicles 160 either alone or in combination with short term commercial paper or any other investment vehicles 160 would also be acceptable. Examples of some other investment vehicles may include, for example, commercial stocks, bonds, commodities, real estate, interest bearing accounts, etc.

The principles and features of the present disclosure may also be implemented in an electronic computer readable medium. For example, a computer can be programmed to establish a funding system in accordance with the principles described above that meets an individual employer's needs.

In one embodiment, the computer program would be programmed to include information on the laws regarding the retirement trust 140, the third party insurance company 150, and the employer's partially or wholly owned or non-owned captive insurance company 130. The incorporated laws may include, for example, the required legal structure of each entity, the maximum and minimum funding required for each entity, the types of activities which may be regulated for each entity, the risk based capital requirements, and the tax advantages and disadvantages of using each entity. Of course, as would be understood by a person of ordinary skill in the art, other information that may be relevant may also be included. The program would accept, as inputs, several key pieces of information regarding the employer 120. For example, this information, in one embodiment may include, the legal structure of the employer 120, the benefits liability of the employer 120, the assets of the employer 120, and the projected future liabilities and assets of the employer 120. Based on these inputs and the information stored within the program, the program may be able to determine what structure the funding system should embody, how much funding should be provided to the trust, what type of trust should be utilized, whether a third party insurance company 150 should be utilized, which third party insurance company 150 should be utilized, what type of partially or wholly owned or non-owned captive insurance company 130 should be utilized, and what type or types of investment vehicles should be utilized.

Of course, the above computer implemented method is merely an exemplary embodiment, and it should be understood that various modifications, additions, and deletions are contemplated depending on the particular situation.

In additional embodiments, the computer implemented method may also be implemented to optimize certain aspects of the present disclosure. The above program described a computer implemented method that assisted an employer in determining the most advantageous arrangement for funding benefits. Once the arrangement is determined, it may be beneficial for employers to optimize the arrangement to their specific needs. In one embodiment, the software may be utilized for any combination of administration of the funding system, optimization of the funding system, performance tracking of the funding system, or managing of the funding system.

For example, the software may be configured to allow a user to track assets and liabilities of the system. In another embodiment, the software may be able to determine the optimum investment strategy for the funds provided to the trust or to the partially or wholly owned or non-owned captive insurance company.

Figure 7:
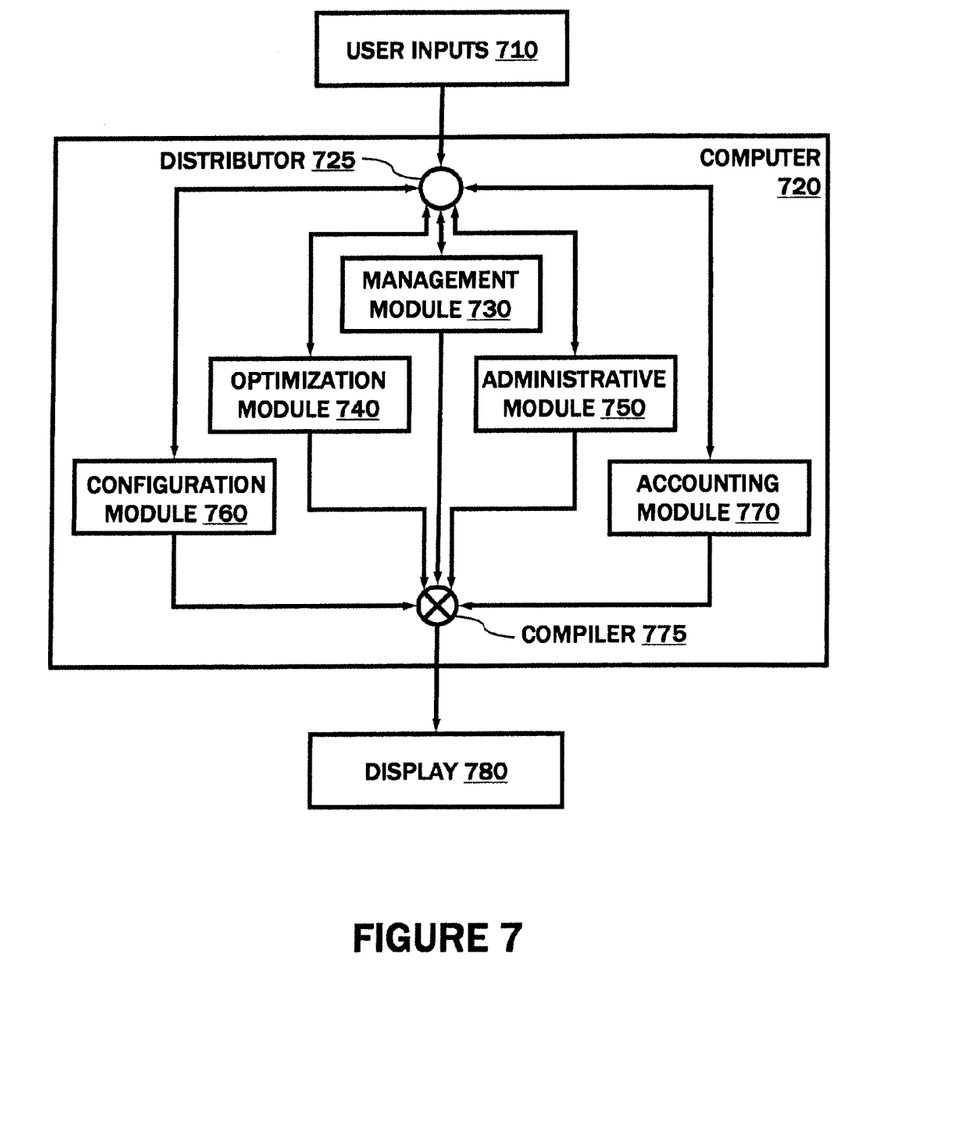
FIG. 7 is a schematic drawing of the computer system involved in accordance with exemplary embodiments described herein.

FIG. 7 is a flow chart of a computer system relating to or for selecting and implementing a funding program in accordance with an exemplary embodiment disclosed herein. The computer system of FIG. 7 includes user inputs 710, a computer 720, and a display 780. In this embodiment, the computer 720 includes 5 modules; a configuration module 760, an optimization module 740, a management module 730, an administrative module 750, and an accounting module 770. The computer can be any electronic device capable of performing the desired function. Likewise, the modules described can be discrete or integrated and can be implemented in software or hardware. As described above, the user inputs 710 may include a number of relevant parameters including, for example, information regarding the census, plan design, corporate structure, the corporate assets, and the corporate liabilities. These user inputs may be input into the computer 720 via a distributor 725. The distributor 725, gathers the information and forwards it to at least one of the modules. Often, the distributor 725 may also convert the data into a form that is more easily interpreted by the modules. The modules each contain parameters and calculating means for using the user inputs 710, where necessary, to obtain the relevant outputs. Additionally, in some embodiments, the modules may be able to communicate with each other. As discussed above, and in more detail below, these parameters and calculating means can be any appropriate information. For example, with respect to the management module 730, the user inputs 710, information from the configuration module 760, information from the optimization module 740 and the parameters specific to the management module, may be used to allow a user to determine several management parameters. Based on, for example, the configuration module 760, the management module may track assets in the trust account, assets paid by the employer, investment return or proceeds from the reinsurance from the partially or wholly owned or non-owned captive insurance company. Additionally, based on the optimization module 740 information and the user inputs 710, the management module 730 may be able to determine, for example, that additional assets are necessary from the employer in six months to ensure the trust is properly funded. Additionally, reports can be generated related to paid benefits, or other parameters. The details of the interaction of these parameters are discussed below.

Additionally, as seen in FIG. 7, to allow a user to utilize the information calculated by the modules (e.g., the software program), outputs are displayed on a display 780 via a compiler 775. The compiler 775 allows the computer 720 to use the output from several modules, for example the accounting module 770 and optimization module 740, at the same time. Since these parameters may be interconnected, it may, in some embodiments, be beneficial for a user to be able to view the information simultaneously. Of course, FIG. 7 is exemplary and several variations of the embodiment should be apparent to a person of ordinary skill in the art.

Several variations for optimization, reporting, administration, tracking and managing will be apparent to a person of ordinary skill in the art. Generally, however, the list below illustrates several variables or assumptions that may be beneficial for the computer implemented system (or the method in general) of the present disclosure.

| | | |
|---|---|---|
| (1) | Year | The number of years the software may calculate data for. |
| (2) | Number of Lives Covered | The starting number of participants. May assume death rates based on any acceptable means. May also account for new employees. |
| | | Policy Accounting |
| (3) | Premium | Assets paid to trust to establish and fund the insurance contract. |
| (4) | Number of Deaths | Estimated number of deaths are computed based on any acceptable means. |
| (5) | Periodic Payments | Payments made by the life, disability, health or annuity contract. |
| (6) | Loads | Basis points charged to the policy. |
| (7) | Investment Earnings | Expected investment return rate based on any acceptable means. |
| (8) | End of Year Policy Reserves | Based on actuarial projections. |
| | | Captive Cash Flow |
| (9) | Direct Premium | The same as (3). |
| (10) | Reinsurance Ceded | Some or all of the risk may be reinsured. It assumes a percentage load by the reinsurance company. |
| (11) | Net Premium | Direct premium less reinsurance ceded. This is the net annual premium amount retained by the captive. |
| (12) | Total Insurance Benefits | Same as (5). |

-continued

| | | |
|---|---|---|
| (13) | Reinsurance Recovery | Generally equal to the benefits received from the reinsurer. |
| (14) | Net Death Benefits | Total Death Benefits (12) less Reinsurance Recovery (13). Net Death Benefits may be paid from the Cash Value. |
| (15) | Premium Tax | Premium tax is calculated based on the sliding scale. For example, Vermont captive insurance premium tax rates are applied to direct premiums. |
| (16) | Expenses | Program administration expenses for this program. |
| (17) | Investable Assets | These are the assets generating investment earnings. Beginning of year invested assets (20) plus annual net premium adjusted for insurance payments (14), expenses (16) and DAC Tax (25). |
| (18) | Investment Earnings | Investment earnings based on any acceptable means. |
| (19) | Cash Tax Expense | Captive's annual income tax (39) adjusted for DAC Tax. |
| (20) | Beginning of Year Invested Assets | Prior year's End of Year Invested Assets (21), $0 in year 1. |
| (21) | End of Year Invested Assets | Beginning of Year Invested Assets (20) plus Investment Earnings (18) and Net Premium (11), less Net Insurance Payments (18), Premium Tax (20), Expenses (16) and Cash Tax Expense (19). |

Deferred Acquisition Cost (DAC)

| | | |
|---|---|---|
| (22) | Current Year DAC | The lesser of a given percentage of premiums and the captive expenses (premium tax and administration expenses). |
| (23) | Amortization | DAC amortization. |
| (24) | Unamortized DAC | Prior year's Unamortized DAC (prior year's 24) plus Current Year DAC (22) minus Amortization (23). |
| (25) | Deferred Tax Asset | Accumulated DAC payments that will be recovered through future amortization. A percentage tax is applied to the Unamortized DAC (24). |

The Captive Income Statement section below represents the impact of the transaction on the Captive's Income Statement.

| | | |
|---|---|---|
| (26) | Direct Premiums | The same as (3). |
| (27) | Reinsurance Ceded | The same as (10). |
| (28) | Net Premiums | The same as (11). |
| (29) | Investment Income | The same as (18). |
| (30) | Gross Income | Net Premiums (28) plus Investment Income (29). |
| (31) | Reinsurance Recoveries | The same as (13). |
| (32) | Net Insurance Payments | The same as (14). |
| (33) | Increase in Policy Reserves | Equal to the annual change in End of Year Policy Reserves (annual change in 8). |
| (34) | Total Benefit Expense | The total benefit expense paid by the captive; Sum of Net Benefits (32), Increase in Policy Reserves (33). |
| (35) | Premium Tax | The same as (15). |
| (36) | Other Expense | The same as (16). |
| (37) | Total Expense | Sum of Total Benefit Expense (34), Premium Tax (35), Other Expense (36). |
| (38) | Pretax Income | Gross Income (30) minus Total Expense (34). |
| (39) | Income Tax | A tax that is applied to Pre-tax income (38). |
| (40) | Net Income | Pretax Income (38) minus Income Tax (39). |

The Captive Balance Statement section below represents the impact of the transaction on the Captive's Balance Sheet.

| | | |
|---|---|---|
| (41) | Investments | Equal to the End of Year Invested Assets (21). |
| (42) | Unamortized DAC | Equal to the Deferred Tax Asset (25). |
| (43) | Total Assets | Investments (41) plus Unamortized DAC (42). |
| (44) | Liabilities (Policy Reserves) | Equal to the End of Year Policy Reserves (8). |
| (45) | Capital | Additional funds needed for capital. If captive is already capitalized, no additional funds will be needed for capital. |
| (46) | Retained Earnings | Net Income (40) plus prior year's Retained Earnings (46) |
| (47) | Total Shareholder Equity | Capital (45) plus Retained Earnings (46). |
| (48) | Total Liabilities and Equity | Liabilities (Policy Reserves) (44) plus Total Shareholder Equity (47). |

The Unconsolidated Earnings Impact (Employer) section below represents the impact of the transaction on Employer's Income Statement.

| | | |
|---|---|---|
| (49) | Service Cost | Component of the expense representing benefits earned in the current year. |
| (50) | Interest Cost | Component of the expense representing interest on the liability. |
| (51) | Expected Return on Assets | Component of the expense representing return on the assets supporting the liability. |
| (52) | Amortization of Gains and Losses | Component of the expense representing recognition in the year of prior gains and losses. |
| (53) | Amortization of Prior Service Cost | Component of the expense representing recognition in the year of the cost of prior plan changes. |
| (54) | Amortization of Net Transition Obligation | Component of the expense representing recognition in the year of an initial accounting transition. |

-continued

| The Unconsolidated Balance Sheet Impact (Employer) section below represents the impact of the transaction on Employer's Balance Sheet. | |
|---|---|
| (55) Projected Benefit Obligation | Measure of the plan's benefit obligation. |
| (56) Asset Value | Measure of the plan's assets. |

In embodiments, any combination of these variables, and others that will be apparent to a person skilled in the art, can be used to establish, optimize, report, administer, track, and manage the funding system of the present disclosure. Additionally, some of the above variables may be input by a user, others may be internally determined based on several factors. In one embodiment, the effective tax rates may be determined according to current state and federal regulations. In other embodiments, a user may be able to input a percentage for the same tax rates. Additionally, as would be understood by a person skilled in the art, some of these variables may be determined by complex statistical models. For example, the death rate may be a complex statistical distribution or a simple rate. For some employers, it may be sufficient to indicate that, for example, a death rate of 2 people per year. However, in other embodiments, the employer may desire a particular distribution of the deaths. Several models may be used, in this embodiment, based on the employer's needs.

The embodiments described herein are intended to be illustrative of this disclosure. As will be recognized by those of ordinary skill in the art, various modifications and changes can be made to these embodiments and such variations and modifications would remain within the spirit and scope of the disclosure defined in the appended claims and their equivalents. Additional advantages and modifications will readily occur to those of ordinary skill in the art. Therefore, the inventions in their broader aspects are not limited to the specific details and representative embodiments shown and described herein.

What is claimed is:

1. A computer implemented method for funding benefits, said computer implemented method comprising:
   electronically accepting, by a computer, inputs related to specific employer information;
   electronically determining, by a computer, an amount of funding to provide to an employer owned trust account;
   electronically calculating, by a computer, what portion of said funding to use to purchase an annuity contract;
   electronically determining, by a computer, whether to purchase said annuity contract from a third party insurance company or a partially or wholly owned or non-owned captive insurance company; and
   electronically determining, by a computer, what portion of said annuity contract should be reinsured by said partially or wholly owned or non-owned captive insurance company when said annuity contract is purchased from said third party insurance company.

2. The computer implemented method of claim 1, wherein said annuity contract is purchased from said third party life insurance company.

3. The computer implemented method of claim 1, further comprising, estimating benefit amounts to be paid or reimbursed by said employer or said trust or said annuity contracts.

4. The computer implemented method of claim 1, further comprising, determining what vehicles said at least one of said trust and said partially or wholly owned or non-owned captive insurance company invests assets in to generate additional assets.

5. The computer implemented method of claim 1, further comprising determining said partially or wholly owned or non-owned captive insurance company invests assets in securities of said employer.

6. The computer implemented method of claim 5, wherein said securities is short term commercial paper of said employer.

7. The computer implemented method of claim 1, further comprising, determining whether said partially or wholly owned or non-owned captive insurance company should be partially owned by said employer or wholly owned by said employer.

8. The computer implemented method of claim 1, further comprising, configuring said annuity contract to maximize a cash value of said annuity contract for a predetermined period of time, or to optimize at least one of a premium or a liability in accordance with an employer's needs.

9. A system for funding benefits, said system comprising:
   a benefits provider computer configured to communicate with at least one of an employer owned trust account or employee owned trust account, a third party insurance company, and a captive insurance company;
   wherein said benefits provider computer is configured to perform at least the following:
   provide funding to said trust account, said amount of funding having been determined by said benefits provider computer or a third party computer;
   instruct said trust account as to what portion of said funding to use to purchase an annuity contract, said portion being determined by said benefits provider computer or said third party computer;
   instructing said trust account as to whether to purchase said annuity contract from said third party insurance company or said captive insurance company; and
   instructing said trust account as to what portion of said annuity contract should be reinsured by said captive insurance company when said at least one life insurance contract or non-cancelable accident and health insurance contract is purchased from said third party insurance company.

* * * * *